(12) United States Patent
Kriese et al.

(10) Patent No.: US 9,547,427 B2
(45) Date of Patent: *Jan. 17, 2017

(54) USER INTERFACE WITH COLOR THEMES BASED ON INPUT IMAGE DATA

(71) Applicant: Microsoft Technology Licensing, LLC, Redmond, WA (US)

(72) Inventors: Jason Kriese, Bellevue, WA (US); J. Craig Hally, Sammamish, WA (US); Georgi Tonev, Seattle, WA (US); Ramrajprabu Balasubramanian, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 56 days.

This patent is subject to a terminal disclaimer.

(21) Appl. No.: 14/541,224

(22) Filed: Nov. 14, 2014

(65) Prior Publication Data
US 2015/0070378 A1    Mar. 12, 2015

Related U.S. Application Data

(63) Continuation of application No. 13/224,331, filed on Sep. 2, 2011, now Pat. No. 8,890,886.

(51) Int. Cl.
*G09G 5/02* (2006.01)
*G06F 3/0484* (2013.01)
*G06T 7/40* (2006.01)

(52) U.S. Cl.
CPC .......... *G06F 3/04845* (2013.01); *G06T 7/408* (2013.01); *G09G 5/02* (2013.01); *G06T 2207/10024* (2013.01); *G09G 2320/0666* (2013.01); *G09G 2340/14* (2013.01); *G09G 2360/16* (2013.01)

(58) Field of Classification Search
None
See application file for complete search history.

(56) References Cited

U.S. PATENT DOCUMENTS

| | | | |
|---|---|---|---|
| 6,986,107 B2 | 1/2006 | Hanggie | |
| 7,046,842 B2 | 5/2006 | Lin et al. | |
| 7,130,461 B2 | 10/2006 | Rosenholtz | |
| 7,184,063 B2 | 2/2007 | Shum | |
| 7,434,165 B2 | 10/2008 | Kleinman et al. | |
| 7,466,315 B2 | 12/2008 | Beda et al. | |
| 7,646,392 B2 | 1/2010 | Klassen | |
| 8,041,111 B1 | 10/2011 | Wilensky | |
| 8,264,499 B1 | 9/2012 | Landry | |
| 8,890,886 B2 | 11/2014 | Kriese | |
| 2007/0291049 A1 | 12/2007 | Edwards et al. | |
| 2009/0272797 A1 | 11/2009 | Doman et al. | |
| 2010/0172573 A1 | 7/2010 | Bailey | |

OTHER PUBLICATIONS

Adobbati, et al., "Automatic Generation of Visual Presentations for Software Understanding", Retrieved at <<http://www.isi.edu/isd/I-DOC/CSS98.html>>, Proceedings of the California Software Symposium, 1998, pp. 10.

First office action mailed Apr. 8, 2014, in U.S. Appl. No. 13/224,331, to be issued as U.S. Pat. No. 8,890,886 on Nov. 18, 2014.

*Primary Examiner* — Edward Martello
(74) *Attorney, Agent, or Firm* — Aaron Chatterjee; Dan Choi; Micky Minhas

(57) ABSTRACT

An application determines a colorization strategy for its graphical user interface according to colors of an input image. In particular, given one or more colors from the input image, and a plurality of elements of the graphical user interface, the colors for the elements of the graphical user interface are selected.

20 Claims, 4 Drawing Sheets

USER INTERFACE WITH COLOR THEMES BASED ON INPUT IMAGE DATA

CROSS-REFERENCE TO RELATED APPLICATIONS

This application is a continuation of U.S. patent application Ser. No. 13/224,331, filed Sep. 2, 2011, now pending, hereby incorporated by reference.

BACKGROUND

A common challenge in designing graphical user interfaces for computer programs is to select a color theme. Many graphical user interfaces provide a set of preset color themes for setting the colors of various elements in the user interface, such as fonts, backgrounds, borders and the like. However, in general, these settings are set once by the user, and remain the same until the user takes an action to change the settings.

In some graphical user interfaces, especially those which present artistic works, such as an image, a selected color theme might not enhance, or might even detract from, the aesthetics of the work. While an application might select a background to match a work, such a solution does not provide a systematic way of selecting the color theme for multiple user interface elements across a wide range of image content.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An application determines a colorization strategy for its graphical user interface according to colors of an input image. In particular, given one or more colors from the input image, and a plurality of elements of the graphical user interface, the colors for the elements of the graphical user interface are selected.

As an example, a user interface can include a background, and a plurality of layers that are composited on the background, with one of the layers including the input image. An input image is processed to identify one or more colors, up to a small number of colors. For example, up to four colors can be identified. The colors of the plurality of layers are set according to the colors identified in the input image. The input image and the plurality of layers in the identified colors are composited on the background to provide the graphical user interface.

Accordingly, in one aspect, an application receives an input image into memory. One or more colors in the input image are identified. Display data for a graphical user interface incorporating the input image is generated. The display data includes a background, the input image and a plurality of design elements, wherein presentation of the design elements is a function of the one or more colors identified in the input image. These elements can be composited together to make the graphical user interface.

In another aspect, a computing machine comprises a processor for executing application programs. The application program, when executed by the processor, includes a color analysis module having an input for receiving an input image and an output providing an indication of a set of colors in the input image. The application also includes a color selection module having an input for receiving the indication of the set of colors and an output providing display data for a graphical user interface incorporating the input image, wherein the display data includes a background, the input image and a plurality of design elements, wherein presentation of the design elements is a function of the one or more colors identified in the input image.

In one embodiment, the presentation of the design elements can include colorization of the design elements using a function of the one or more colors identified in the input image. For example, colorization of one of the design elements can use a color identified in the input image and the colorization of another of the design elements can use a luminance adjusted color identified in the input image. In another embodiment, the presentation of the design elements can include hiding a feature of the user interface based on a color identified in the input image.

The identification of one or more colors in the input image can include filtering out unwanted colors from the set of colors. The set of colors can be identified by reducing the input image to a small image of a small number of pixels, such that the set of colors is provided by the small number of pixels.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a dynamic graphical user interface can be implemented.

Figure 1:
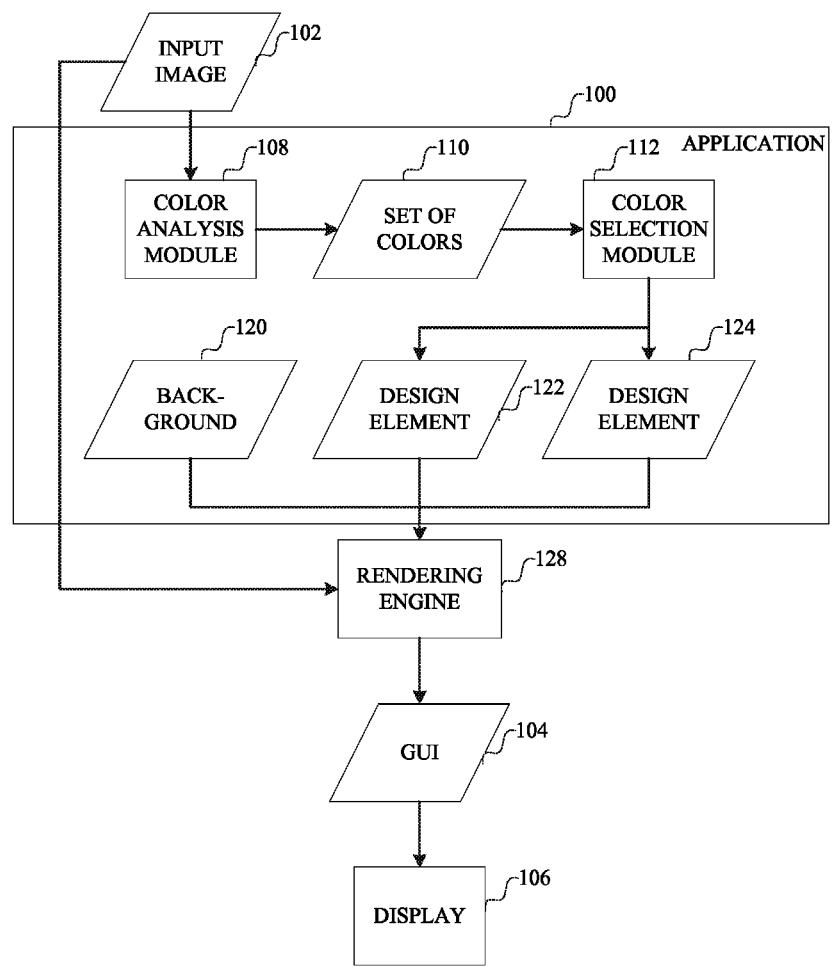
FIG. 1 is a block diagram of an example application with a dynamic graphical user interface.

Referring to FIG. 1, an application 100 running on a computer (not shown), receives an input image 102 which will be displayed on a display 106 as part of a graphical user interface 104. For example, the application 100 can be an audio player that displays an album cover while music from an album is being played. Other applications, include, but are not limited to, image editing applications, photo processing and management applications, video processing and management applications, animation tools, camera applications, and other applications that process image data. The graphical user interface, for example, can include a background 120, on which a design element 122, design element 124 and input image 102 are composited by rendering engine 128 to produce the graphical user interface 104.

The application includes a color analysis module 108 which processes the input image to provide one or more characteristic colors 110 from the image. A color selection module 112 uses the characteristic colors 110 to select colors that are appropriate for the user interface elements, namely design elements 122 and 124, in the graphical user interface 104.

Given this context, an example implementation of the color analysis and color selection modules will now be described in more detail.

There are a variety of ways in which one or more colors could be derived from an input image. Any technique from which two or more colors, up to the complete color spectrum represented in the file itself, are selected could be used, such as a color histogram, a scaling operation (such as described below), or other analysis.

Figure 2:
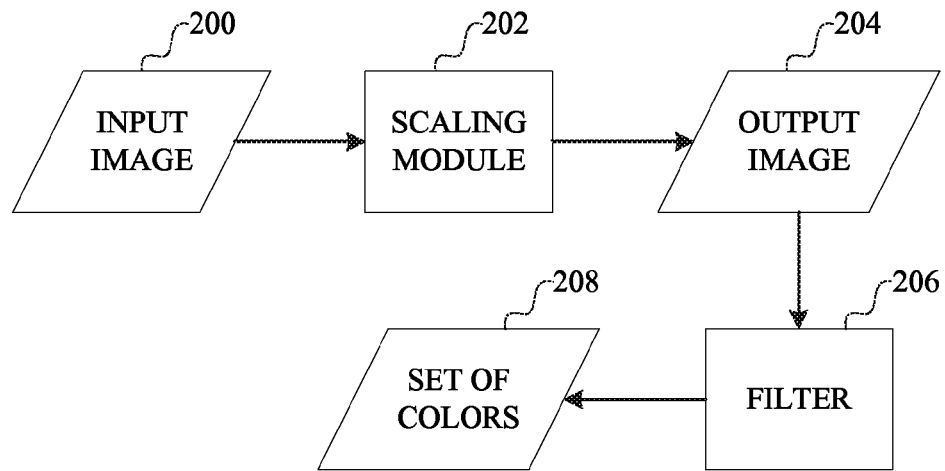
FIG. 2 is a data flow diagram illustrating an example implementation of a color analysis module.

In one implementation shown in FIG. 2, the input image 200 is input to a scaling module 202, to provide a scaled down output image 204, which is very small, such as an image that is three pixels by three pixels (a "3×3 image") or even two pixels by two pixels (a "2×2 image"). The colors appearing in this scaled down image are considered the primary colors in the input image. The scaled down image 204 is filtered by filter 206 to eliminate pixels that are unwanted. For example, the filter could eliminate pixels that are too close to black (RGB all close to the minimum, e.g., 0 to 15), too close to white (RGB all close to the maximum, e.g., 240 to 255) or too close to a grey (RGB all very close to each other, e.g., within 15 of each other on a 0-255 scale). Other colors could be selected and filtered out. The output is a set 208 of one or more pixels values that represent the primary colors in the input image. If, as a result of the filter 206, there are no colors in set 208, then default colors can be used. This process of scaling the input image and filtering out unwanted colors from the scaled image provides a computationally efficient way of identifying colors in the input image.

Figure 3:
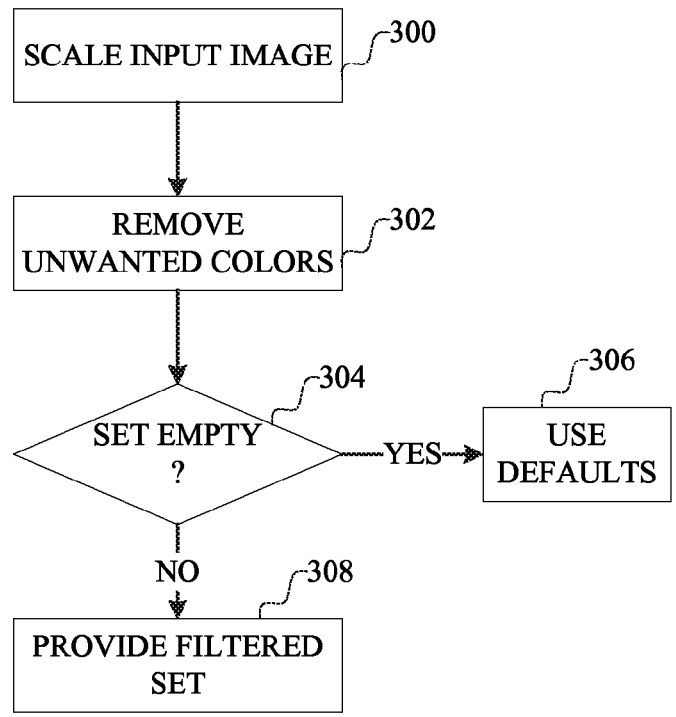
FIG. 3 is flow chart describing an example operation of the system in FIG. 2.

Referring now to FIG. 3, a flowchart describing the process of analysis of the input image will now be described. The input image is scaled 300, for example to a 2×2 or 3×3 image. The scaled input image is treated as a set of pixels, from which unwanted colors are removed 302, such as black pixels, white pixels and grey pixels. If no pixels remain, as determined at 304, then default colors are provided 306, otherwise, the colors remaining from the pixels in the set are provided 308.

It should be understood that the foregoing is merely one example way of analyzing an input image to identify a set of colors. A variety of other techniques could be used, including, but not limited to histogram generation, image blurring and smoothing, and the like.

Given a set of two or more colors, color selection for the graphical user interface will now be described in connection with FIGS. 4-5.

To provide for generality across various graphical user interface designs, consider a graphical user interface that includes a background, one or more design elements, and the input image, which are composited together. The background can be a fixed color, such as black, or a function of the input image. The one or more design elements can have a color that is a function of the input image.

The designer of the graphical user interface determines which of the design elements are primary, secondary, tertiary, etc., and decides, for each element, how a set of colors derived from an arbitrary input image is mapped to each of these elements. The designer may consider whether there are one, two, three, or more colors available and provide different mappings for each. The designer also may specify a default mapping.

As an example, referring to the table below, a graphical user interface with a background, four design elements, and the input image is considered, and a mapping is presented for one, two and four colors.

| GUI Element | Layer | 1 color | 2 colors | 4 colors | Default |
|---|---|---|---|---|---|
| Background | Bottom (1) | Black | Black | Black | Black |
| Input Image | Top (5) | Input | Input | Input | Input |
| Design Element 1 | Layer 2 | Dominant color | Darkest color | Darkest color | White |
| Design Element 2 | Layer 2 | Dominant color | Second darkest color | Second darkest color | Light Grey |
| Design Element 3 | Layer 3 | Dominant color | Darkest color | Third darkest color | Dark Grey |
| Design Element 4 | Layer 4 | Dominant color, luminance adjusted | Darkest color, luminance adjusted | Darkest color, luminance adjusted | White |

The foregoing table illustrates that the design elements can be colorized based on a color found in the input image, or based on a luminance adjusted color. For example, if an image has a light blue, the design element could be made to be a dark blue, by adjusting its luminance. For example, if the color values are represented by a range, e.g., from 0 to 255, luminance could be reduced by a portion of that range, e.g., 25, with the adjustment limited to a threshold (so that it does not become too dark or tool light), e.g., a minimum of 35 to avoid it being too dark.

It should be understood that the foregoing is merely an example of how a designer could select a color theme. While a table is shown, the design element colorization could be implemented in a variety of other ways, such as by functions defined in a computer program.

Figure 4:
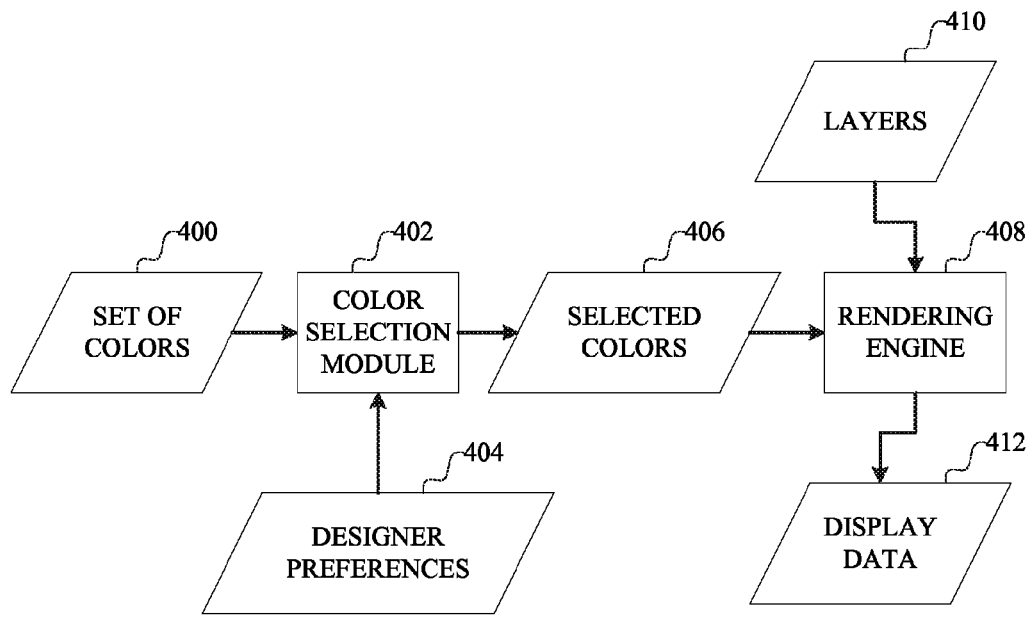
FIG. 4 is a data flow diagram illustrating an example implementation of a color selection module.

Thus, referring now to FIG. 4, the set 400 of colors is input to the color selection module 402, which also accesses information defining the designer preferences 404 (such as the table above). The selected colors 406 for each of the design elements are output to a rendering engine 408 that composites the layers 410 of the user interface to generate the display data 412 for the graphical user interface.

Figure 5:
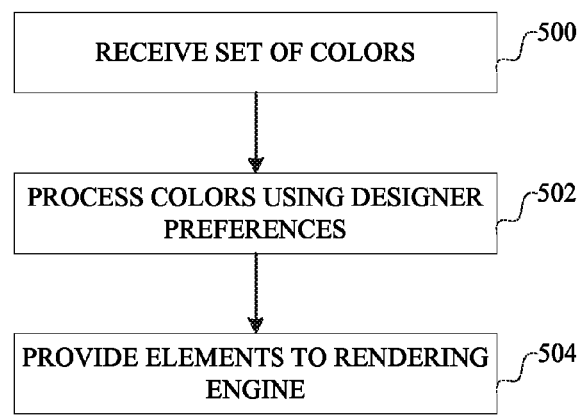
FIG. 5 is flow chart describing an example operation of the system in FIG. 4.

A flowchart describing this process is shown in FIG. 5. First, the set of colors is received 500. The set of colors is processed 502 according to designer preferences encoded in the application, to provide a colorization for each of the design elements of the graphical user interface. The color selection for the design elements is provided 504 to the rendering engine which produces the display data for the graphical user interface.

It should be understood that the application can, in addition to or instead of adjusting the color of design elements of the user interface, adjust the feature set of the application. For example, features of the application could be hidden or shown according to the visual characteristics of the input image. For example, an option to darken an image, in an image editing application, can be made not to appear when the image is already dominated by dark colors. The input image could be, for example, a live picture of a user's environment, enabling ambient colors to be incorporated into the graphical user interface.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
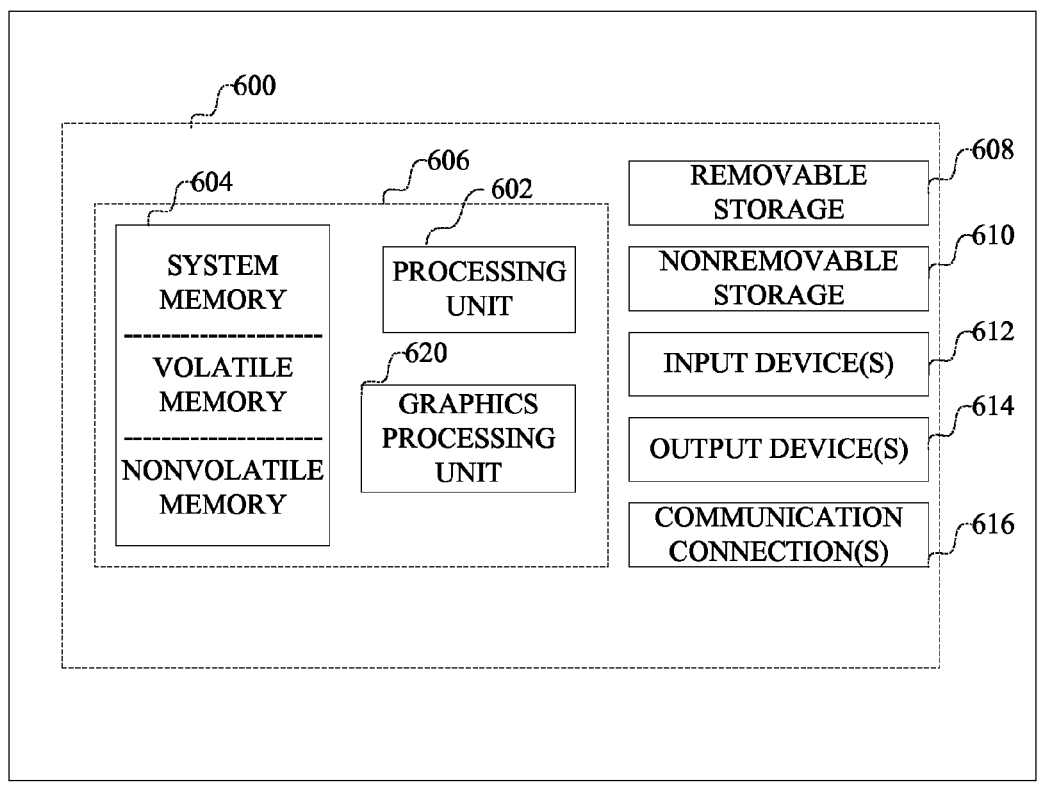
FIG. 6 is a block diagram of an example computing device in which such a system can be implemented.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computing environment includes a computing machine, such as computing machine 600. In its most basic configuration, computing machine 600 typically includes at least one processing unit 602 and memory 604. The computing device may include multiple processing units and/or additional co-processing units such as graphics processing unit 620. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606.

Additionally, computing machine 600 may also have additional features/functionality. For example, computing machine 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media.

Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 600. Any such computer storage media may be part of computing machine 600.

Computing machine 600 may also contain communications connection(s) 612 that allow the device to communicate with other devices. Communications connection(s) 612 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 600 may have various input device (s) 614 such as a display, a keyboard, mouse, pen, camera, touch input device, and so on. Output device(s) 616 such as speakers, a printer, and so on may also be included. All of these devices are well known in the art and need not be discussed at length here.

The system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:
1. A computer-implemented process comprising:
receiving an input image into memory;
identifying one or more colors in the input image; and
generating display data for a graphical user interface comprising a plurality of layers, wherein the display data includes:
a background as a bottom layer,
the input image as a top layer and on the background, and at least one design element as at least one other layer on the background,
wherein generating the display data includes determining presentation of the at least one design element as a function of the one or more colors identified in the input image.

2. The computer-implemented process of claim 1, wherein presentation of the at least one design element includes selecting the color for the at least one design element.

3. The computer-implemented process of claim 2, wherein selecting the color includes accessing a mapping defining how the one or more colors in the input image are mapped to the design elements.

4. The computer-implemented process of claim 3, wherein the mapping is a function of a number of colors available from the input image.

5. The computer-implemented process of claim 1, wherein generating the display data includes selecting a color for the background as a function of the one or more colors identified in the input image.

6. The computer implemented process of claim 2, wherein selecting the color of the at least one design element uses a luminance adjusted color identified in the input image.

7. The computer implemented process of claim 1, wherein determining the presentation of the at least one design element comprises making the at least one design element for accessing a feature of an application not appear in the user interface based on a color identified in the input image.

8. The computer implemented process of claim 1, wherein generating the graphical user interface includes compositing the input image and the at least one design element on the background.

9. The computer implemented process of claim 3, wherein the mapping includes a color setting for each of the background and the at least one design element as a function of the one or more colors derived from the input image.

10. The computer implemented process of claim 9 wherein the mapping includes different mappings according to a number of colors derived from the input image.

11. An article of manufacture comprising:
a computer storage medium;
computer program instructions stored on the computer storage medium which, when processed by a processing device, instruct the processing device to perform a process comprising:
receiving an input image into memory;
identifying one or more colors in the input image; and
generating display data for a graphical user interface comprising a plurality of layers, wherein the display data includes:
a background as a bottom layer,
the input image as a top layer and on the background,
and at least one design element as at least one other layer on the background,
wherein generating the display data includes determining presentation of the at least one design element as a function of the one or more colors identified in the input image.

12. The article of manufacture of claim 11, wherein presentation of the at least one design element includes selecting the color for the at least one design element.

13. The article of manufacture of claim 12, wherein selecting the color includes accessing a mapping defining how the one or more colors in the input image are mapped to the design elements.

14. The article of manufacture of claim 13, wherein the mapping is a function of a number of colors available from the input image.

15. A computing machine comprising:
a processor for executing application programs, wherein an application program, when executed by the processor, includes:
a color analysis module having an input for receiving an input image and an output providing an indication of a set of colors in the input image;
a color selection module having an input for receiving the indication of the set of colors and an output providing display data for a graphical user interface comprising a plurality of layers incorporating the input image, wherein the display data includes a background as a bottom layer, the input image as a top layer and on the background and at least one design element as another layer on the background, wherein presentation of the at least one design element is a function of the one or more colors identified in the input image.

16. The computing machine of claim 15, further comprising a rendering engine for compositing the input image and the at least one design element on the background.

17. The computing machine of claim 15, wherein the presentation of the at least one design element comprises colorization of the at least one design element using a function of the one or more colors identified in the input image.

18. The computing machine of claim 17, wherein the colorization of the at least one design element uses a luminance adjusted color identified in the input image.

19. The computing machine of claim 15, wherein the presentation of the at least one design element comprises making the at least one design element for accessing a feature of an application not appear in the user interface based on a color identified in the input image.

20. The computing machine of claim 15, wherein the color analysis module filters out pixels of unwanted colors from the input image and generates the set of colors from colors of remaining pixels in the input image.

* * * * *